No. 775,647. PATENTED NOV. 22, 1904.
F. O. FARWELL.
VARIABLE SPEED AND REVERSING MECHANISM.
APPLICATION FILED FEB. 2, 1904.
NO MODEL. 2 SHEETS—SHEET 1.
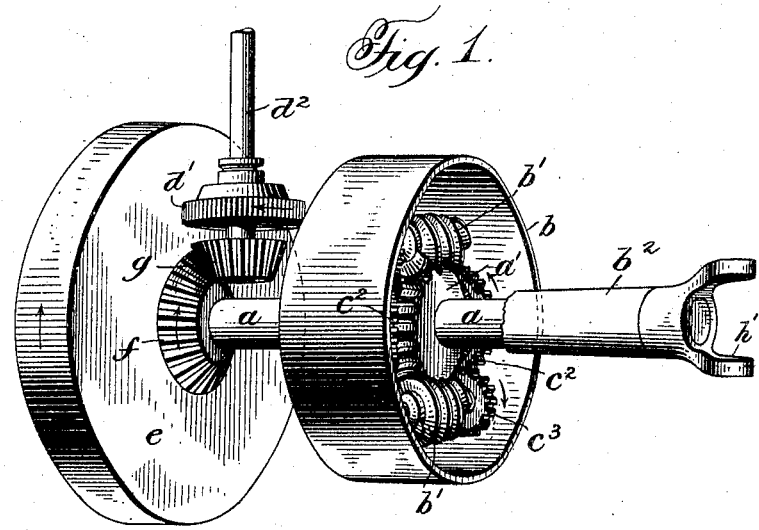
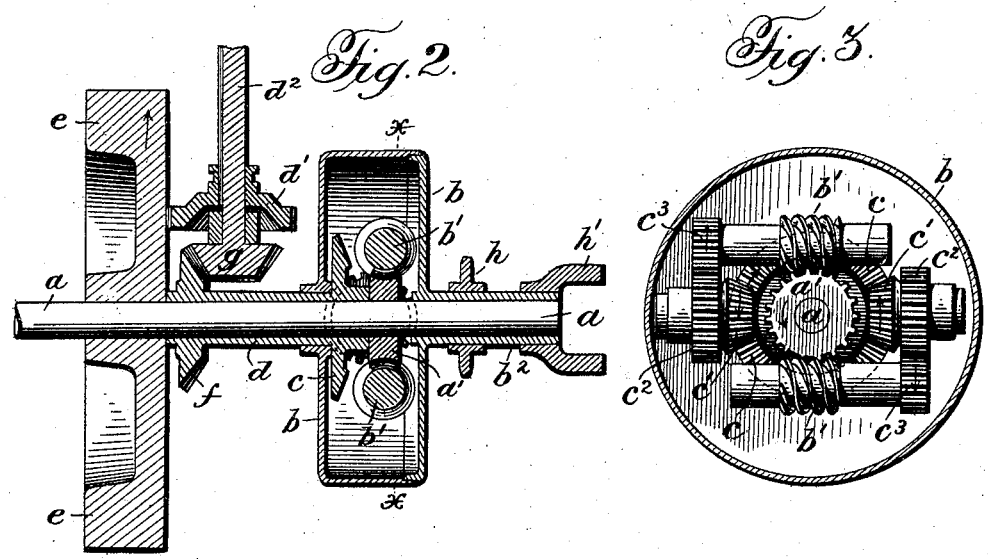

No. 775,647. PATENTED NOV. 22, 1904.
F. O. FARWELL.
VARIABLE SPEED AND REVERSING MECHANISM.
APPLICATION FILED FEB. 2, 1904.
NO MODEL. 2 SHEETS—SHEET 2.
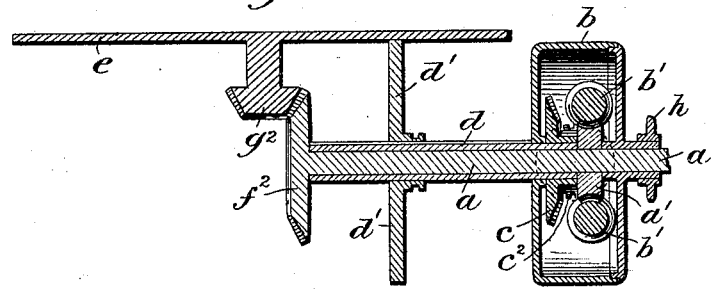
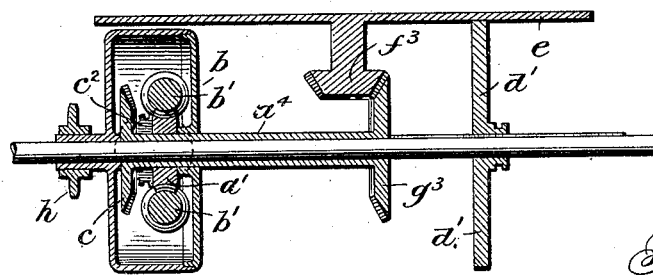
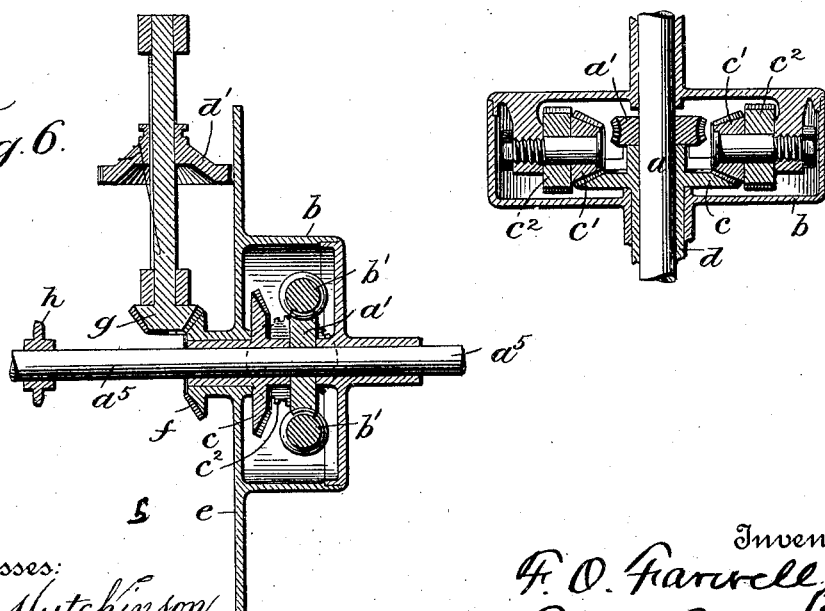
Witnesses:
Jas. E. Hutchinson
Chas. J. O'Neill
Inventor:
F. O. Farwell
By Pennie & Goldsborough
Attorneys.

No. 775,647.  
Patented November 22, 1904.

UNITED STATES PATENT OFFICE.

FAY O. FARWELL, OF DUBUQUE, IOWA, ASSIGNOR OF ONE-HALF TO THE ADAMS COMPANY, OF DUBUQUE, IOWA.

VARIABLE-SPEED AND REVERSING MECHANISM.

SPECIFICATION forming part of Letters Patent No. 775,647, dated November 22, 1904.

Application filed February 2, 1904. Serial No. 191,703. (No model.)

*To all whom it may concern:*

Be it known that I, FAY O. FARWELL, a citizen of the United States, residing in the city and county of Dubuque, State of Iowa, have invented certain new and useful Improvements in Variable-Speed and Reversing Mechanism; and I do hereby declare the following to be a full, clear, and exact description of the invention, such as will enable others skilled in the art to which it appertains to make and use the same.

My invention relates to variable-speed and reversing mechanism, and has for its object to provide mechanism for varying the speed and direction of rotation of motor-vehicles, machine-tools, and the like in which a smooth, positive, and gradually increasing or decreasing motion in either the forward or reverse direction is desired, said mechanism being positive in its driving effect, simple in construction, and requiring no high degree of skill on the part of the operator.

To this end the invention consists, essentially, of a driving member connected to any suitable source of power—such as a gas-engine or a steam-engine, a driven member, preferably revolving around the same axis as the driving member, from which driven member the power is taken at variable speed and direction of motion, a worm-gearing carried by the driving and driven members, respectively, and means for varying the speed of the worm-gearing—whereby the speed and direction of rotation of the driven member is regulated.

My invention is illustrated in the accompanying drawings, in which—

Figure 1 is a perspective view of a preferred form of my device. Fig. 2 is a longitudinal sectional elevation thereof. Fig. 3 is a section on line X X of Fig. 2. Fig. 4 shows a modified form of the variable-speed worm-controlling device. Fig. 5 shows another modification of said device. Fig. 6 illustrates a still further modification of the apparatus, and Fig. 7 is a fragmentary view showing the revoluble frame and the mode of mounting the gearing therein.

Referring to Figs. 1, 2, and 3 of the drawings, $a$ indicates the driving member or shaft, which is actuated from any suitable source of power—as, for example, a steam-engine or a gas-engine. Surrounding this shaft and free to revolve thereon is a frame or casing $b$, which is secured to stub-shaft $b^2$, designated the "driven member," from which power and motion may be taken by any suitable means—such as ordinary toothed gearing, a belt engaging said casing $b$, a chain from the sprocket $h$, or by a knuckle-joint and flexible shaft from the joint-yoke $h'$. (Shown in Fig. 1.) It is to be observed that the designation "driven member" as applied to the casing $b$ and its connected shaft $b^2$ is merely relative, and in the event of connecting the source of power to these parts instead of the primary shaft $a$, hereinbefore referred to, the relation of driving and driven members would necessarily be reversed.

Secured to the shaft $a$ is a worm-wheel $a'$, which necessarily partakes of the rotary motion of said shaft. Journaled in the frame or casing $b$ in proper relation to mesh with the worm-wheel $a'$ aforesaid are two worms $b'$ $b'$, which in addition to a motion of rotation about their axes partake of any rotary motion imparted to said casing. Loosely mounted upon the shaft $a$ and within the casing $b$ is a bevel-wheel $c$, which is connected by a suitable hollow shaft $d$ with a bevel-pinion $f$. Mounted on suitable studs in the frame or casing $b$ are two bevel-pinions $c'$ $c'$, meshing with the bevel-gear $c$, and secured to the respective studs carrying the bevel-pinions $c'$ $c'$ are gear-wheels $c^2$ $c^2$, meshing with pinions $c^3$ $c^3$ on the shafts of the respective worms $b'$ $b'$. A friction-disk $e$ is secured to the shaft $a$ adjacent to bevel-pinion $f$ and is engaged by a friction-wheel $d'$, which is slidably mounted upon a shaft $d^2$ to engage said friction-disk $e$ at different distances from the center of said disk, so that as the latter revolves with the shaft $a$ the wheel $d'$ will have a variable speed imparted to it. Secured to the shaft $d^2$ is a bevel-gear $g$, meshing with the pinion $f$, and thereby serving to drive the worms $b'$ through the gear-train thus completed. It will be seen, therefore, that the speed of rotation of the worms $b'$ upon their own axes will be dependent upon the position of the friction-wheel $d'$ with respect to the friction-disk $e$.

It is to be noted that the angle of the threads of the worm $b'$ is such that the latter is self-locking and that therefore any pressure brought to bear upon these threads or teeth by the engaging teeth of the worm-wheel $a'$ will, while it has a tendency to turn the worm, be ineffective to do so, and if the worm-gearing were not otherwise operated it would merely have the effect of connecting casing $b$ and its shaft $b^2$ to the driving-shaft $a$, so that any motion imparted to the latter would be transmitted directly to the driven shaft. If, however, an independent rotation be applied to the worm $b'$, it will have the effect of accelerating, retarding, reversing, or stopping the motion of the driven shaft.

Assuming that the driving member $a$ revolves in the direction indicated by the arrow in Fig. 3 at a speed, say, of one hundred revolutions per minute, the worm-wheel $a'$ would of course revolve at the same speed. Assuming also that the worm-wheel has sixteen teeth and that the worm $b'$ has a double thread, said worm will revolve eight times as fast as the worm-wheel if it were independently driven. Now if through the medium of the several bevel-gears and spur-gears $g$, $f$, $c$, $c'$, $c^2$, and $c^3$ the worm $b'$ be driven eight times as fast as the driving member $a$ and correspondingly the worm-wheel $a'$ it will be seen that the worm will revolve idly in the worm-wheel, having no tendency to creep around the latter either in the direction of revolution or in the reverse direction. Hence the casing $b$ and driven shaft $b^2$ will remain stationary. This condition will obtain whenever the friction-wheel $d$ is brought into contact with the friction-disk $e$ at such point that its speed is sufficient to drive the worms $b$ eight times as fast as the driving-shaft $a$ revolves. If, however, the friction-roller $d'$ is moved into contact with the friction-disk $e$ nearer its center, the speed of rotation of the worm will be diminished below eight times that of the shaft $a$, and the worm-wheel and the worm $b'$, together with the casing $b$ and the driven shaft $b^2$, will revolve in the same direction as the driving member—viz., a forward direction. As the friction-roller is moved still farther toward the center and the speed of rotation of the worm is still more reduced the casing and driven member will revolve faster in a forward direction until when the bevel-gear $c$ is driven at the same speed as the worm-wheel $a'$ the driven member $b^2$ will revolve at its maximum speed, the worm and the gearing which connects the bevel-gear $c$ therewith will cease to revolve around their respective axes, and the whole planetary system inclosed in the casing will revolve as a unit. Conversely, if the speed of the worm were increased beyond eight hundred revolutions per minute or more than eight times as fast as shaft $a$ it will be apparent that the worm will move around the worm-wheel in a direction opposite that of the revolution of said wheel, and thereby cause the casing $b$ and driven shaft $b^2$ to revolve also in the opposite or reverse direction. This change of direction of rotation of the driven member is produced by moving the friction-wheel $d'$ toward the edge of the friction-disk beyond the point where it produced no motion of the driven parts, and accordingly by adjusting the position of said friction-wheel beyond this point the speed of the driven member in its reverse motion may be varied at will.

It will be noted that the various modifications involve only colorable departures from the form of the mechanism shown in Figs. 1 to 3. In Fig. 4, for example, the friction-disk $e$ is not mounted upon the driving-shaft $a$, but is geared thereto, while the friction-wheel $d'$ is mounted directly upon the sleeve $d$, to which gear $c$ is secured. In this form the direction and speed of rotation is controlled by moving the friction-wheel $d'$ toward or from the center of the friction-disk $e$.

In Fig. 5 the hollow shaft $a^4$ is the driving member and is connected by suitable bevel-gears $g^3 f^3$ with friction-disk $e$, which in turn drives the shaft $a^3$ through the medium of the adjustable friction-wheel $d'$ thereon, and thereby controls the speed of the worms $b' b'$, as before.

In Fig. 6 the casing $b$ is the driving member and the shaft $a^5$ is the driven member, and friction-disk $e$ is formed as part of the driver $b$. In other respects this form of the apparatus is practically the same as that shown in Fig. 1.

In all of these several forms the principle of operation involved is the same. The driving and driven members revolve around the same axis. A planetary worm-gearing connects said driving and driven members, and a variable-speed device controls the speed of the worm, whereby the speed and direction of motion of the driven member is regulated.

The particular manner of regulating the speed of the worm is not an essential part of the invention, although I prefer the means shown in the drawings. It is also obvious that other forms of speed-varying mechanism than the friction-disk $e$ and the engaging friction-roller $d'$ might be employed without departing from the spirit of the invention, which contemplates, essentially, the provision of a connection between the driving and driven members of means of a positive irreversible gearing, such as a worm-gearing, together with means for varying the speed of the worm.

It will be noticed that (except when reversing) the worm always turns in the direction of least resistance. The driving member tending to turn independently of the driven member exerts a pressure between the teeth of the worm-wheel and the thread of the worm. The angle of the contacting surfaces of the teeth in this worm-gearing is quite acute, yet it is not sufficient to permit the worm-wheel to drive the worm. It requires, however, a very slight effort on the part of the worm-speed-controlling device to keep the worm turning even when the maximum power is being transmitted. Therefore the driving effort of the friction-gearing is necessarily very slight, and it is only when the driven member is reversed in its direction of motion that any considerable driving effort is required on the part of the variable-speed worm-controlling device.

Having thus described my invention, what I claim, and desire to secure, is—

1. A variable-speed and reversing mechanism, comprising a driving member, a driven member revolving around the same axis as the driving member, non-reversing worm-gearing connecting the driving and driven members, and having rotatory motion about the same axis as said members, and means for driving said worm-gearing and varying the speed thereof, whereby the speed and direction of rotation of the driven member are regulated.

2. A variable-speed and reversing mechanism, comprising a driving member, a driven member revolving around the same axis as the driving member, non-reversing worm-gearing connecting the driving and driven members and having rotatory motion about the same axis as said members, and gearing connecting the driving member and the worm-gearing for varying the speed of the latter, whereby the speed and direction of rotation of the driven member may be regulated.

3. A variable-speed and reversing mechanism, comprising a driving member, a driven member, a worm and a worm-wheel connecting the driving and driven members for concurrent or independent movement of the said members and having rotatory motion about the same axis as said members, and means for driving the worm-gearing and varying the speed thereof from the same to a lower or a higher speed than the driving member, whereby the driven member will remain stationary or have a variable speed in a forward or a reverse direction imparted to it.

4. A variable-speed and reversing mechanism, comprising a driving member, a driven member, a worm and a worm-wheel connecting the driving and driven members for concurrent or independent movement of said members and having rotatory motion about the same axis as said members, and variable-speed friction-gearing driven by the driving member for actuating the worm-gearing at the same speed as, or a lower or higher speed than that of the driving member, whereby the driven member will remain stationary or be rotated in a forward or a reverse direction at variable speeds.

5. A variable-speed and reversing mechanism, comprising a driving-shaft, a driven shaft revolving around the same axis as the driving-shaft, a worm-wheel fast to the driving-shaft, a worm carried by the driven shaft meshing with said worm-wheel and adapted to rotate about the latter, and variable-speed gearing for driving said worm, whereby the speed and direction of rotation of the driven shaft are regulated.

6. A variable-speed and reversing mechanism, comprising a driving-shaft, a driven shaft revolving around the same axis as the driving-shaft, a worm-wheel fast on the driving-shaft, a frame on the driven shaft, a worm carried by said frame and meshing with said worm-wheel, a friction-disk driven by said driving-shaft, an adjustable friction-wheel driven by said disk, and gearing connecting said disk and said worm for varying the speed of the latter, whereby the driven shaft may be held stationary or variably rotated in a forward or reverse direction.

7. A variable-speed and reversing mechanism, comprising a driving member, a driven member, worm-gearing carried by the driving and driven members respectively, and means for driving the worm-gearing and varying the speed thereof, whereby the speed and direction of rotation of the driven member are regulated.

8. A variable-speed and reversing mechanism, comprising a driving member, a driven member, a worm-wheel carried by the driving member, a worm carried by the driven member and meshing with said worm-gear, and means for driving the worm and varying the speed thereof, whereby the speed and direction of rotation of the driven member are regulated.

In testimony whereof I affix my signature in presence of two witnesses.

FAY O. FARWELL.

Witnesses:
H. H. BECK,
E. F. HEIL.